US012753270B2

(12) United States Patent
Kouno et al.

(10) Patent No.: US 12,753,270 B2
(45) Date of Patent: Oct. 6, 2026

(54) EPOXY RESIN CURING AGENT, EPOXY RESIN COMPOSITION, AND PAINT

(71) Applicant: MITSUBISHI GAS CHEMICAL COMPANY, INC., Tokyo (JP)

(72) Inventors: Kazuki Kouno, Kanagawa (JP); Aoi Yokoo, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 414 days.

(21) Appl. No.: 18/285,510

(22) PCT Filed: Mar. 18, 2022

(86) PCT No.: PCT/JP2022/012575
§ 371 (c)(1),
(2) Date: Oct. 4, 2023

(87) PCT Pub. No.: WO2022/215494
PCT Pub. Date: Oct. 13, 2022

(65) Prior Publication Data

US 2024/0209142 A1 Jun. 27, 2024

(30) Foreign Application Priority Data

Apr. 8, 2021 (JP) ................................ 2021-066001

(51) Int. Cl.

| | |
|---|---|
| ***C08G 59/50*** | (2006.01) |
| ***C08G 59/18*** | (2006.01) |
| ***C08L 63/00*** | (2006.01) |
| ***C09D 163/00*** | (2006.01) |

(52) U.S. Cl.
CPC ....... *C08G 59/5033* (2013.01); *C08G 59/184* (2013.01); *C08G 59/50* (2013.01); *C08G 59/5006* (2013.01); *C08L 63/00* (2013.01); *C09D 163/00* (2013.01)

(58) Field of Classification Search
CPC ............ C08G 59/5033; C08G 59/5006; C08G 59/184; C08G 59/50; C09D 163/00; C08L 63/00
See application file for complete search history.

(56) References Cited

U.S. PATENT DOCUMENTS

2023/0416450 A1* 12/2023 Hanaoka .............. C08G 59/245

FOREIGN PATENT DOCUMENTS

| | | | | |
|---|---|---|---|---|
| CN | 1261480 | | 6/2006 | |
| CN | 112048151 | A * | 12/2020 | ............ B29C 70/52 |
| EP | 4 201 978 | | 6/2023 | |
| JP | 2006-070125 | A | 3/2006 | |
| JP | 2007-191527 | A | 8/2007 | |
| WO | WO-2017175741 | A1 * | 10/2017 | ............ C08G 59/50 |
| WO | 2021/048282 | A1 | 3/2021 | |

OTHER PUBLICATIONS

International Search Report issued May 31, 2022 in International Bureau of WIPO Patent Application No. PCT/JP2022/012575 with an English translation thereof.
Written Opinion issued May 31, 2022 in International Bureau of WIPO Patent Application No. PCT/JP2022/012575 with an English translation thereof.

* cited by examiner

*Primary Examiner* — Rabon A Sergent
(74) *Attorney, Agent, or Firm* — GREENBLUM & BERNSTEIN, P.L.C.

(57) ABSTRACT

Provided are an epoxy resin curing agent containing a polyamine (A) or an adduct modified product of the polyamine (A), the polyamine (A) including a diamine (A1) represented by the following formula (1), an epoxy resin composition, and a paint containing these:

wherein $R^1$ to $R^8$ each independently represent a hydrogen atom or an aliphatic group having 1 to 5 carbon atoms.

(1)

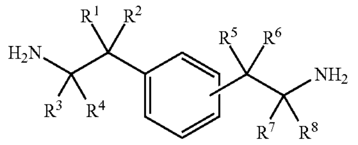

7 Claims, No Drawings

EPOXY RESIN CURING AGENT, EPOXY RESIN COMPOSITION, AND PAINT

TECHNICAL FIELD

The present invention relates to an epoxy resin curing agent, an epoxy resin composition and a paint.

BACKGROUND ART

Epoxy resin compositions in which various polyamines such as xylylenediamine are employed as an epoxy resin curing agent have been widely used in the paint fields, such as a corrosion-resistant paint for ships, bridges, iron structures on land and sea, and in the civil engineering construction fields, such as lining, reinforcement, repair materials of concrete structures, floor materials of buildings, lining of water supply and sewage systems, paving materials, and adhesives. Of these, for epoxy resin compositions for paints, it is important that coating films provided therefrom have good appearances, water resistance, chemical resistance, coating film physical properties, and the like.

Polyamines such as xylylenediamine or modified products thereof are known to be useful as epoxy resin curing agents for paints.

For example, Patent Literature 1 discloses that an epoxy resin composition, comprising a predetermined modified epoxy resin and an amine-based curing agent as essential components, has low viscosity and is excellent in low temperature curing and also excellent in mechanical strength and curing physical properties such as moisture resistance and adhesiveness, and the epoxy resin composition is suitable particularly for civil engineering, paint, and adhesion applications. As the amine-based curing agent, ones including a Mannich reaction modified product of metaxylylenediamine as the main component are exemplified.

CITATION LIST

Patent Literature

PTL 1: JP 2007-191527 A

SUMMARY OF INVENTION

Technical Problem

Metaxylylenediamine, when used as an epoxy resin curing agent, has an advantage that fast curing, high chemical resistance, and the like are provided. However, metaxylylenediamine is likely to form a carbonate owing to an action with carbon dioxide present in air. Thus, when metaxylylenediamine or a modified product thereof is used as a curing agent, the coating film formed may whiten (blushing) to lead to a decrease in transparency. As metaxylylenediamine has an aromatic ring, the coating film formed may yellow over time, and room for improvement is left also in weather resistance.

An object of the present invention is to provide an epoxy resin curing agent and an epoxy resin composition with which coating films excellent in transparency and weather resistance can be formed, and paints containing these.

Solution to Problem

The present inventors have found that the above problems can be solved by an epoxy resin curing agent containing a polyamine or an adduct modified product of the polyamine, wherein the polyamine comprises a diamine having a specific structure.

Accordingly, the present invention relates to the following.

[1] An epoxy resin curing agent containing a polyamine (A) or an adduct modified product of the polyamine (A), wherein the polyamine (A) includes a diamine (A1) represented by the following formula (1):

(1)

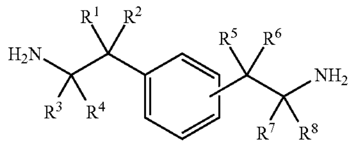

wherein $R^1$ to $R^8$ each independently represent a hydrogen atom or an aliphatic group having 1 to 5 carbon atoms.

[2] The epoxy resin curing agent according to the above [1], wherein the adduct modified product is a reaction composition including a reaction product of the polyamine (A) and an epoxy compound having at least one epoxy group.

[3] The epoxy resin curing agent according to the above [1] or [2], wherein the diamine (A1) is at least one selected from the group consisting of diamines represented by the following formulas (1-1) to (1-3).

(1-1)

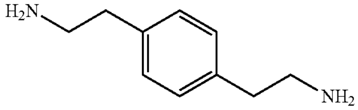

(1-2)

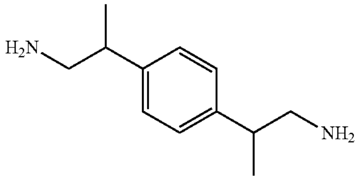

(1-3)

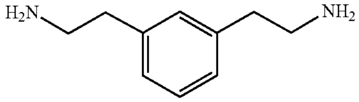

[4] The epoxy resin curing agent according to any one of the above [1] to [3], wherein the content of the diamine (A1) in the polyamine (A) is 5 mass % or more.

[5] The epoxy resin curing agent according to any one of the above [1] to [4], wherein the polyamine (A) further contains xylylenediamine.

[6] The epoxy resin curing agent according to any one of the above [1] to [5], wherein the total content of the polyamine (A) and an adduct modified product thereof in the entire curing agent components included in the epoxy resin curing agent is 50 mass % or more.

[7] An epoxy resin composition containing an epoxy resin and the epoxy resin curing agent according to any one of the above [1] to [6].

[8] A paint containing the epoxy resin composition according to the above [7].

Advantageous Effects of Invention

The present invention can provide an epoxy resin curing agent and an epoxy resin composition with which coating films excellent in transparency and weather resistance can be formed, and paints containing these.

DESCRIPTION OF EMBODIMENTS

[Epoxy Resin Curing Agent]

An epoxy resin curing agent of the present invention is an epoxy resin curing agent containing a polyamine (A) or an adduct modified product of the polyamine (A), wherein the polyamine (A) comprises a diamine (A1) represented by the following formula (1). Accordingly, the curing agent contains at least one selected from the group consisting of the polyamine (A) and an adduct modified product of the polyamine (A):

(1)

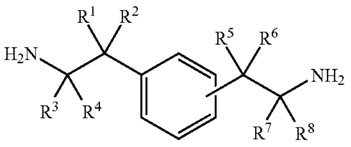

wherein $R^1$ to $R^8$ each independently represent a hydrogen atom or an aliphatic group having 1 to 5 carbon atoms.

Use of the epoxy resin curing agent can provide an epoxy resin composition with which coating films excellent in transparency and weather resistance can be formed. Hereinafter, the epoxy resin curing agent of the present invention is also referred to simply as "the curing agent of the present invention".

The reason why a coating film excellent in transparency and weather resistance can be formed by using the curing agent of the present invention for an epoxy resin composition is not clear, but it is considered as follows.

As described above, xylylenediamine is problematically likely to form a carbonate and whiten owing to an action with carbon dioxide present in air and also likely to yellow over time because of having an aromatic ring. Further, it is considered that, as xylylenediamine has a benzyl skeleton, hydrogen atoms in the benzyl position are likely to be extracted and a decrease in weather resistance attributable to this has occurred.

In contrast to this, the diamine (A1) represented by the formula (1) is stable because extraction of hydrogen atoms is unlikely to occur in comparison with xylylenediamine and unlikely to whiten even when coming into contact with carbon dioxide. For this reason, it is considered that the epoxy resin composition containing the epoxy resin curing agent of the present invention in which the diamine (A1) is used allows a coating film to be formed to have good transparency and weather resistance.

(Diamine (A1))

The diamine (A1) is a diamine represented by the following formula (1):

(1)

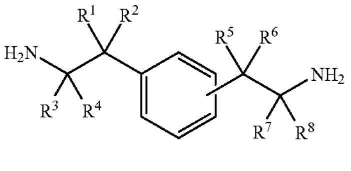

wherein $R^1$ to $R^8$ each independently represent a hydrogen atom or an aliphatic group having 1 to 5 carbon atoms.

Examples of the aliphatic group having 1 to 5 carbon atoms in $R^1$ to $R^8$ of the formula (1) include an alkyl group having 1 to 5 carbon atoms and an alkenyl group or an alkynyl group having 2 to 5 carbon atoms. From the viewpoint of forming a coating film excellent in transparency and weather resistance, the aliphatic group is preferably an alkyl group having 1 to 5 carbon atoms. Examples of the alkyl group include a methyl group, an ethyl group, a n-propyl group, an i-propyl group, a n-butyl group, an i-butyl group, a sec-butyl group, t-butyl group, a n-pentyl group, and an i-pentyl group. From the viewpoint of forming a coating film excellent in transparency and weather resistance, of these, an alkyl group having 1 to 3 carbon atoms is preferred, a methyl group or an ethyl group is more preferred, and a methyl group is further preferred.

From the viewpoint of forming a coating film excellent in transparency and weather resistance and from the viewpoint of improvement in curing, $R^1$ to $R^8$ in the formula (1) are each independently preferably a hydrogen atom or a methyl group, four or more of $R^1$ to $R^8$ each are more preferably a hydrogen atom, and six or more of $R^1$ to $R^8$ each are further preferably a hydrogen atom. Alternatively, all of $R^1$ to $R^8$ each may be a hydrogen atom.

In a more preferable aspect, in the formula (1), $R^3$, $R^4$, $R^7$, and $R^8$ each are a hydrogen atom, and $R^1$, $R^2$, $R^5$, and $R^6$ each are a hydrogen atom or a methyl group. In a further preferable aspect, $R^2$, $R^3$, $R^4$, $R^5$, $R^7$, and $R^8$ each are a hydrogen atom, and $R^1$ and $R^6$ each are a hydrogen atom or a methyl group.

From the viewpoint of forming a coating film excellent in transparency and weather resistance, and from the viewpoint of improvement in curing, the diamine (A1) is preferably a diamine represented by the following formula (1') and more preferably at least one selected from the group consisting of diamines represented by the following formulas (1-1) to (1-4):

(1')

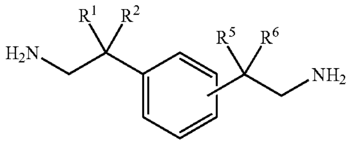

wherein $R^1$, $R^2$, $R^5$, and $R^6$ each independently represent a hydrogen atom or a methyl group.

(1-1)

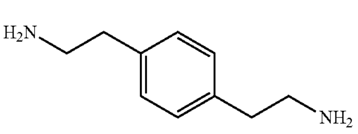

(1-2)

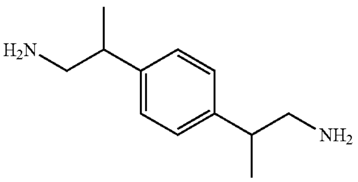

-continued (1-3)

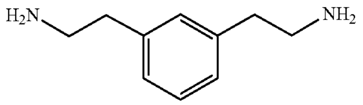

(1-4)

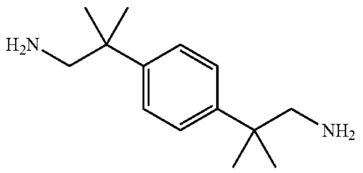

From the viewpoint of forming a coating film excellent in transparency and weather resistance, and from the viewpoint of improvement in curing, the diamine (A1) is further preferably at least one selected from the group consisting of diamines represented by the following formulas (1-1) to (1-3).

(1-1)

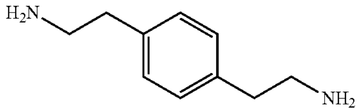

(1-2)

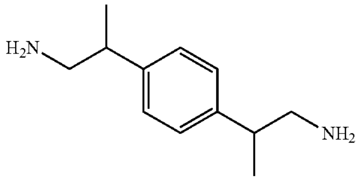

(1-3)

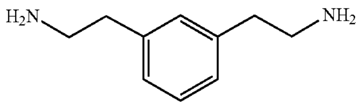

From the viewpoint of forming a coating film excellent in transparency and water resistance, the diamine (A1) is preferably at least one selected from the group consisting of a diamine represented by the formula (1-2) and a diamine represented by the formula (1-3). From the viewpoint of forming a coating film more excellent in weather resistance, the diamine (A1) is preferably at least one selected from the group consisting of a diamine represented by the formula (1-1) and a diamine represented by the formula (1-2).

The diamine (A1) represented by the formula (1) may be produced by a known method.

For example, the diamine represented by the formula (1-1) (p-benzenediethaneamine; pBDEA) is provided by reducing p-xylylene dicyanide under a hydrogen atmosphere. The diamine represented by the formula (1-2) (2-[4-(2-amino-1-methylethyl)phenyl]propylamine; pBDEA-2M) may be produced in accordance with the description of Example 1 in JP 2004-503527 A.

The diamine represented by the formula (1-3) (m-benzenediethaneamine; mBDEA) is provided by reducing m-xylylene dicyanide under a hydrogen atmosphere. The diamine represented by the formula (1-4) may be produced in accordance with the description of Example 3 in JP 2004-503527 A.

<Polyamine (A)>

The polyamine (A) to be used in the curing agent of the present invention contains the diamine (A1) represented by the formula (1). The content of the diamine (A1) in the polyamine (A) is, from the viewpoint of forming a coating film excellent in transparency and weather resistance, preferably 1 mass % or more, more preferably 2 mass % or more, further preferably 5 mass % or more, still further preferably 10 mass % or more, still further preferably 15 mass % or more, still further preferably 20 mass % or more, still further preferably 30 mass % or more, still further preferably 40 mass % or more, still further preferably 50 mass % or more, and also 100 mass % or less.

The polyamine (A) may also contain a polyamine other than the diamine (A1). A polyamine other than the diamine (A1) is not particularly limited as long as being a compound having at least two amino groups in the molecule. Examples thereof include 1,2-bis(aminomethyl)cyclohexane, 1,3-bis(aminomethyl)cyclohexane, 1,4-bis(aminomethyl)cyclohexane, orthoxylylenediamine, metaxylylenediamine (MXDA), paraxylylenediamine (PXDA), menthene diamine, isophorone diamine (IPDA), diaminodicyclohexylmethane, bis(4-amino-3-methylcyclohexyl)methane, N-aminomethylpiperidine, norbornanediamine, bis(aminomethyl)tricyclodecane, ethylenediamine, diethylenetriamine, triethlenetetramine, tetraethylenepentamine, pentaethylenehexamine, polyoxyalkylenediamine, and polyoxyalkylenetriamine. These can be used singly or in combinations of two or more thereof.

Of those described above, from the viewpoint of achieving an effect of improving the transparency and weather resistance of the coating film to be provided and from the viewpoint of achieving curing and good coating film physical properties, by containing the polyamine (A) or an adduct modified product thereof, a polyamine other than the diamine (A1) is preferably xylylenediamine, more preferably one or more selected from the group consisting of metaxylylenediamine and paraxylylenediamine, and further preferably metaxylylenediamine. In other words, besides the diamine (A1), the polyamine (A) preferably further contains xylylenediamine, more preferably contains one or more selected from the group consisting of metaxylylenediamine and paraxylylenediamine, and further preferably contains metaxylylenediamine.

When the polyamine (A) contains a polyamine other than the diamine (A1), the mass ratio between the diamine (A1) in the polyamine (A) and the polyamine other than the diamine (A1) is, from the viewpoint of forming a coating film excellent in transparency and weather resistance, preferably 1/99 to 99/1, more preferably 5/95 to 99/1, further preferably 10/90 to 99/1, and still further preferably 15/85 to 99/1.

When the diamine (A1) is the diamine represented by the formula (1-1) and the polyamine other than diamine (A1) is xylylenediamine, the mass ratio between the diamine represented by the formula (1-1) and xylylenediamine is, from the viewpoint of forming a coating film excellent in transparency, weather resistance, and water resistance, still further preferably 20/80 to 99/1, still further preferably 30/70 to 95/5, and still further preferably 40/60 to 90/10.

When the diamine (A1) is the diamine represented by the formula (1-2) and the polyamine other than the diamine (A1) is xylylenediamine, the mass ratio between the diamine represented by the formula (1-2) and xylylenediamine is, from the viewpoint of forming a coating film excellent in transparency, weather resistance, and water resistance, still further preferably 20/80 to 99/1 and still further preferably 30/70 to 99/1.

When the diamine (A1) is the diamine represented by the formula (1-3) and the polyamine other than the diamine (A1) is xylylenediamine, the mass ratio between the diamine represented by the formula (1-3) and xylylenediamine is, from the viewpoint of forming a coating film excellent in transparency, weather resistance, and water resistance, still further preferably 20/80 to 99/1.

<Adduct Modified Product of Polyamine (A)>

Specific examples of an adduct modified product of the polyamine (A) include reaction products provided by reacting the polyamine (A) with an epoxy compound having at least one epoxy group, an unsaturated hydrocarbon compound, a carboxylic acid or a derivative thereof, or the like; Mannich reaction products provided by reacting the polyamine (A) with a phenol compound, and an aldehyde compound; and ketoimines (ketimines) provided by reacting the polyamine (A) with a ketone compound.

Of these, from the viewpoint of forming a coating film excellent in transparency and weather resistance and from the viewpoint of improvement in water resistance, the adduct modified product of the polyamine (A) is preferably a reaction composition containing a reaction product of the polyamine (A) and an epoxy compound having at least one epoxy group. A reaction composition containing a reaction product of the polyamine (A) and an epoxy compound having at least one epoxy group herein means a reaction composition containing a product provided by a reaction of the polyamine (A) and the epoxy compound, the product being a reaction product (adduct) of the diamine and the epoxy compound. The reaction composition may contain an unreacted starting material and the like. Hereinafter, the reaction composition is also referred to simply as "the reaction composition".

The epoxy compound for use in the reaction composition may be a compound having at least one epoxy group, and a compound having 2 or more epoxy groups is more preferred.

Specific examples of the epoxy compound include epichlorohydrin, butyl diglycidyl ether, neopentyl glycol diglycidyl ether, 1,3-propanediol diglycidyl ether, 1,4-butanediol diglycidyl ether, 1,6-hexanediol diglycidyl ether, biphenol diglycidyl ether, dihydroxynaphthalene diglycidyl ether, dihydroxyanthracene diglycidyl ether, triglycidyl isocyanurate, tetraglycidyl glycoluril, polyfunctional epoxy resins having a glycidylamino group derived from m-xylylenediamine, polyfunctional epoxy resins having a glycidylamino group derived from 1,3-bis(aminomethyl)cyclohexane, polyfunctional epoxy resins having a glycidylamino group derived from diaminodiphenylmethane, a glycidylamino group derived from p-aminophenol and/or polyfunctional epoxy resins having a glycidyloxy group, polyfunctional epoxy resins having a glycidyloxy group derived from bisphenol A, polyfunctional epoxy resins having a glycidyloxy group derived from bisphenol F, polyfunctional epoxy resins having a glycidyloxy group derived from phenol novolac, and polyfunctional epoxy resins having 2 or more glycidyloxy groups derived from resorcinol. These can be used singly or in combinations of two or more thereof.

From the viewpoint of forming a coating film excellent in transparency and weather resistance, from the viewpoint of improvement in water resistance, and from the viewpoint of curing, the epoxy compound is more preferably a compound containing an aromatic ring or an alicyclic structure in the molecule, further preferably a compound including an aromatic ring in the molecule, and still further preferably a polyfunctional epoxy resin having a glycidyloxy group derived from bisphenol A.

A reaction composition is provided by ring-opening addition reacting polyamine (A) and an epoxy compound in a known manner. In an exemplary method, a reactor is charged with the polyamine (A), the epoxy compound is added batchwise or added in portions by dropwise addition or the like thereto and subjected to a reaction by heating. The addition reaction is preferably conducted under an inert atmosphere such as nitrogen gas.

The amount of the polyamine (A) and epoxy compound to be used is not particularly limited as long as a ratio is achieved at which a reaction product to be provided contains an amino group having active hydrogen. In the addition reaction, an excess of the polyamine (A) is preferably used relative to the epoxy equivalent of the epoxy compound from the viewpoint that a reaction product to be provided exhibits a function as an epoxy resin curing agent. Specifically, the polyamine (A) and the epoxy compound are used such that the number of active hydrogen atoms in the polyamine (A) to the number of epoxy groups in epoxy compound (number of active hydrogen atoms in polyamine (A)/number of epoxy groups in epoxy compound) is preferably 50/1 to 4/1 and more preferably 20/1 to 4/1.

The temperature and reaction time during the addition reaction can be appropriately selected. From the viewpoint of the reaction rate, productivity, prevention of decomposition of the starting material, and the like, the temperature during the addition reaction is preferably from 50 to 150° C. and more preferably from 70 to 120° C. The reaction time is preferably from 0.5 to 12 hours and more preferably from 1 to 6 hours after addition of the epoxy compound is completed.

The curing agent of the present invention may be a curing agent consisting of the polyamine (A) or an adduct modified product thereof and may also contain other curing agent components. Examples of other curing agent components include curing agent components other than the polyamine and an adduct modified product thereof, such as a phenol-based curing agent.

However, from the viewpoint of forming a coating film excellent in transparency and weather resistance, the total content of the polyamine (A) and an adduct modified product thereof in the entire curing agent components included in the curing agent of the present invention is preferably 50 mass % or more, more preferably 60 mass % or more, further preferably 70 mass % or more, still further preferably 80 mass % or more, still further preferably 90 mass % or more, still further preferably 95 mass % or more, and also 100 mass % or less.

The curing agent of the present invention, from the viewpoint of curing and from the viewpoint of achieving good coating film physical properties, preferably contains an adduct modified product of the polyamine (A) and more preferably contains a reaction composition containing a reaction product of the polyamine (A) and an epoxy compound having at least one epoxy group. When the curing agent of the present invention contains the reaction composition as the adduct modified product of the polyamine (A), the content of the reaction composition in the curing agent of the present invention is, relative to the entire curing agent components in the curing agent, preferably 50 mass % or more, more preferably 60 mass % or more, further preferably 70 mass % or more, still further preferably 80 mass % or more, still further preferably 90 mass % or more, still further preferably 95 mass % or more, and also 100 mass % or less, from the viewpoint of forming a coating film excellent in transparency and weather resistance, from the viewpoint of curing and the viewpoint of achieving good coating film physical properties.

The curing agent components in the curing agent means components having two or more active hydrogen atoms that may react with epoxy groups in the epoxy resin contained in the curing agent, and the mass % of the reaction composition relative to the entire curing agent component in the curing agent refers to the ratio of the reaction composition contained relative to the total amount of the curable components contained in the curing agent.

Additionally, a well-known curing accelerator, a non-reactive diluent such as benzyl alcohol, or the like may also be formulated with the curing agent of the present invention, within a range not impairing the effects of the present invention.

The active hydrogen equivalent of the curing agent component in the curing agent of the present invention is, although depending on the components contained in the curing agent, preferably 40 or more from the viewpoint of achieving good coating film physical properties and preferably 150 or less from the viewpoint of improvement in curing. The active hydrogen equivalent weight (hereinafter, also referred to as "AHEW") is the mass of the epoxy resin curing agent per mol of active hydrogen.

[Epoxy Resin Composition]

The epoxy resin composition of the present invention contains an epoxy resin and the epoxy resin curing agent. A coating film to be formed of the epoxy resin composition of the present invention has high transparency and weather resistance and is suitably used in paints, for example.

<Epoxy Resin>

The epoxy resin as the main agent of the epoxy resin composition may be any of saturated or unsaturated aliphatic compounds or alicyclic compounds, aromatic compounds, and heterocyclic compounds. From the viewpoint of providing a cured product having high water resistance, an epoxy resin including an aromatic ring or an alicyclic structure in the molecule is preferred.

Specific examples of the epoxy resin include at least one resin selected from the group consisting of epoxy resins having a glycidylamino group derived from m-xylylenediamine, epoxy resins having a glycidylamino group derived from p-xylylenediamine, epoxy resins having a glycidylamino group derived from 1,3-bis(aminomethyl)cyclohexane, epoxy resins having a glycidylamino group derived from 1,4-bis(aminomethyl)cyclohexane, epoxy resins having a glycidylamino group derived from diaminodiphenylmethane, epoxy resins having a glycidylamino group and/or a glycidyloxy group derived from p-aminophenol, epoxy resins having a glycidyloxy group derived from bisphenol A, epoxy resins having a glycidyloxy group derived from bisphenol F, epoxy resins having a glycidyloxy group derived from phenol novolac, and epoxy resin having a glycidyloxy group derived from resorcinol. The epoxy resins described above may be used in mixture of two or more thereof.

Of those described above, from the viewpoint of providing good coating film physical properties, as the epoxy resin, ones including, as the main component, at least one selected from the group consisting of epoxy resins having a glycidylamino group derived from m-xylylenediamine, epoxy resins having a glycidylamino group derived from p-xylylenediamine, epoxy resins having a glycidyloxy group derived from bisphenol A, and epoxy resins having a glycidyloxy group derived from bisphenol F are preferred. From the viewpoint of providing good coating film physical properties and from the viewpoint of availability and cost efficiency, ones including, as the main component, an epoxy resin having a glycidyloxy group derived from bisphenol A are more preferred.

The "main component" referred to herein means that other components may be included without departing from the gist of the present invention, meaning preferably from 50 to 100 mass %, more preferably from 70 to 100 mass %, and further preferably from 90 to 100 mass % of the total.

The content of the epoxy resin curing agent in the epoxy resin composition of the present invention is an amount at which the ratio of the number of active hydrogen atoms in the epoxy resin curing agent to the number of epoxy groups in the epoxy resin (number of active hydrogen atoms in epoxy resin curing agent/number of epoxy groups in epoxy resin) is preferably from 1/0.5 to 1/2, more preferably from 1/0.75 to 1/1.5, and further preferably from 1/0.8 to 1/1.2.

The epoxy resin composition of the present invention may also contain a modifying component such as a filler and a plasticizer, a component for adjusting flowability such as a thixotropic agent, and other components such as a pigment, a leveling agent, a tackifier and elastomer fine particles depending on the use.

However, the total content of the epoxy resin and the epoxy resin curing agent in the epoxy resin composition is preferably 50 mass % or more, more preferably 70 mass % or more, further preferably 80 mass % or more, and still further preferably 90 mass % or more, and still further preferably 95 mass % or more, and also 100 mass % or less from the viewpoint of achieving the effects of the present invention.

The method for preparing the epoxy resin composition of the present invention is not particularly limited, and the composition may be produced by mixing the epoxy resin, the epoxy resin curing agent, and other components as required by a known method using a known apparatus. The order of mixing the components to be contained in the epoxy resin composition is not particularly limited. The epoxy resin curing agent may be prepared and then mixed with an epoxy resin, and preparation may be conducted by simultaneously mixing the components constituting the epoxy resin curing agent and other components, and the epoxy resin.

A coating film which is a cured product of the epoxy resin composition of the present invention is provided by curing the epoxy resin composition of the present invention mentioned above by a known method. Conditions for curing the epoxy resin composition are appropriately selected depending on applications and forms, without being particularly limited.

The coating film which is a cured product of the epoxy resin composition of the present invention will be excellent in transparency and weather resistance, whitening of the coating film is unlikely to occur, and occurrence of yellowing over time can be suppressed after the coating film is formed.

[Paint]

The present invention provides paints containing the epoxy resin composition. When paints of the present invention contain the epoxy resin composition, coating films to be provided will have good transparency and weather resistance. Examples of the paint include ship paints, heavy-duty anticorrosive paints, paints for tanks, paints for interior painting and paints for exterior painting of pipes, and paints for floor materials.

The content of the epoxy resin composition in the paints of the present invention is preferably 50 mass % or more, more preferably 70 mass % or more, further preferably 80 mass % or more, still further preferably 90 mass % or more, still further preferably 95 mass % or more and may be 100 mass % from the viewpoint of improvement in transparency and weather resistance.

EXAMPLES

Hereinafter, the present invention will be described in more detail with reference to Examples and Comparative Examples, but the present invention is not limited to the following Examples. Evaluations on epoxy resin curing agents, epoxy resin compositions, and cured products thereof were carried out in the following manners.

<RCI Curing Time>

The epoxy resin composition in each example was applied onto a glass plate (manufactured by Taiyu Machinery Co., Ltd., 25×348×2.0 mm) under the conditions of 23° C. and 50% R.H., by using an applicator of 76 m, thereby forming a coating film. The glass plate on which the coating film was formed was set on a paint drying time measuring instrument (manufactured by Taiyu Machinery Co., Ltd.), the striations when the needle of the measuring instrument scratched the surface of the coating film were observed, and the time to reach each drying step (Set to Touch, Dust Free, and Dry Through) was measured based on the following criteria. The results are shown in Tables 1 to 4. A shorter time indicates a higher curing rate.

Set to Touch: time taken until when traces of the needle start to remain on the glass plate Dust Free: time taken until when traces of the needle emerges from the middle of the coating film onto the surface of the coating film Dry Through: time taken until when no traces of the needle remain on the coating film <Coating Film Appearance (Transparency)>

A zinc phosphate-treated steel plate (manufactured by PALTECH Co., Ltd.; SPCC-SD PB-N144 0.8×70×150 mm) was used as a base material. Under conditions of 23° C. and 50% R.H., an epoxy resin composition of each example was applied using an applicator onto the base material to form a coating film (thickness immediately after application: 200 m). This coating film was kept under the conditions of 23° C. and 50% R.H., and the appearance thereof after 1 day passed was visually observed to evaluate the transparency based on the following criteria. The results are shown in Tables 1 to 4.

(Transparency)

Ex: No turbidity existed

G: Slight turbidity existed, but no problem with use

F: White turbidity existed

<Set to Touch>

A coating film was formed (thickness immediately after application: 200 m) by applying an epoxy resin composition on a base material (zinc phosphate-treated steel plate) in the same manner as described above. This coating film was kept under the conditions of 23° C. and 50% R.H., and after 1 day, 2 days, or 7 days passed, was evaluated by touching based on the following criteria. The results are shown in Table 1.

Ex: Excellent (there is no sticking of the coating film even when the thumb is pressed with a force of about 50 N, and no fingerprints remain)

G: Good (there is no sticking of the coating film even when the thumb is pressed with a force of about 50 N, but fingerprints remain after touching)

F: Fair (there is sticking of the coating film when the thumb is pressed with a force of about 50 N)

P: Poor (there is sticking of the coating film when the thumb is pressed with a force of about 5 N)

<Pencil Hardness>

A coating film was formed (thickness immediately after application: 200 m) by applying an epoxy resin composition on a base material (zinc phosphate-treated steel plate) in the same manner as described above. This coating film was kept under the conditions of 23° C. and 50% R.H., and after 1, 2, and 7 days passed, the pencil hardness was measured in accordance with JIS K5600-5-4:1999. The results are shown in Table 1.

<Water Resistance Spot Test>

A coating film was formed (thickness immediately after application: 200 m) by applying an epoxy resin composition on a base material (zinc phosphate-treated steel plate) in the same manner as described above. This coating film was kept under the conditions of 23° C. and 50% R.H., and after 1, 2, and 7 days passed, 2 to 3 drops of pure water were dropped on the surface of the coating film with a dropper, and the portion was covered with a 50 mL screw tube bottle. After 24 hours passed, water was wiped off, and the appearance was observed visually and evaluated according to the following criteria. The results are shown in Tables 1 to 4.

Ex: No change at all

G: Slight changes existed, but good

F: Changes existed

<YI>

A weather resistance test was conducted in accordance with the standard of ISO 4982, Part 3, Method A.

The epoxy resin composition provided in each of Examples was cured in a mold of 20 mm×20 mm×2 mm in thickness under an environment of 23° C. and 50% R.H. for 7 days to produce a specimen. The YI value of this specimen was measured using a color difference meter ("COH400" manufactured by Nippon Denshoku Industries Co., Ltd.) in accordance with JIS K7373:2006. Then, the specimen was placed in an UV tester "SUNTEST XXL+" (manufactured by Toyo Seiki Seisaku-sho, Ltd.) and irradiated with ultraviolet light having a wavelength of 300 to 400 nm at a temperature of 38° C. from a xenon lamp at an intensity of an illumination intensity of 60 $W/m^2$. After the dose of UV irradiation reached 30,000 ($kJ/m^2$), the specimen was taken out, and the YI value was measured in the same manner as described above. The difference between the YI values before and after the weather resistance test was taken as a ΔYI value. The results are shown in Tables 1 to 4. A smaller ΔYI value indicates that the cured product has better weather resistance.

Production Example 1 (Synthesis of p-benzenediethaneamine (pBDEA))

p-Xylylene dicyanide (manufactured by Tokyo Chemical Industry Co., Ltd.) was reduced under a hydrogen atmosphere, and the resulting product was purified by distillation to provide p-benzenediethaneamine (pBDEA) represented by the following formula (1-1). As a result of an analysis using gas chromatography, the purity was 99.7%.

(1-1)

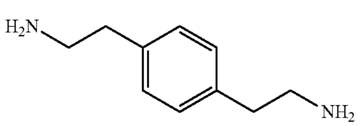

Production Example 2 (Synthesis of 2-[4-(2-amino-1-methylethyl)phenyl]propylamine (pBDEA-2M))

2-[4-(2-Amino-1-methylethyl)phenyl]propylamine dihydrochloride was provided in accordance with the description of Example 1 in JP 2004-503527 A. The hydrochloride was neutralized and then extracted with a solvent, and the resulting extract was purified by distillation to provide a compound represented by the formula (1-2), 2-[4-(2-amino-1-methylethyl)phenyl]propylamine (pBDEA-2M). As a result of an analysis using gas chromatography, the purity was 94.6%. As a result of analysis by neutralization titration using dilute hydrochloric acid, the concentration of the amino group was 10.35 mmol/g.

(1-2)

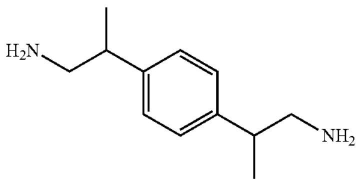

Production Example 3 (Synthesis of m-benzenediethaneamine (mBDEA))

m-Xylylene dicyanide (manufactured by Tokyo Chemical Industry Co., Ltd.) was reduced under a hydrogen atmosphere, and the resulting product was purified by distillation to provide m-benzenediethaneamine (mBDEA) represented by the following formula (1-3). As a result of an analysis using gas chromatography, the purity was 99.6%.

(1-3)

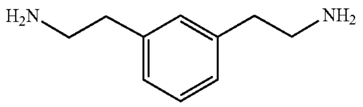

Example 1 (Preparation and Evaluation of Epoxy Resin Curing Agent, and Epoxy Resin Composition)

Preparation of Epoxy Resin Curing Agent 41.3 g of pBDEA provided in Production Example 1 was loaded in a separable flask having an inner volume of 1 liter and equipped with a stirrer, a thermometer, a nitrogen inlet tube, a dropping funnel, and a condenser, and the temperature was raised to 80° C. with stirring under a nitrogen stream. With the temperature kept at 80° C., 18.7 g (an amount at which number of active hydrogen atoms in amine/number of epoxy groups in epoxy compound=10/1 is achieved) of a polyfunctional epoxy resin having glycidyloxy groups derived from bisphenol A ("jER828" manufactured by Mitsubishi Chemical Corporation, epoxy equivalent: 186 g/equivalent) as an epoxy compound was added dropwise over 2 hours. After the dropwise addition was completed, the temperature was raised to 100° C., a reaction was conducted for 2 hours, and a reaction composition comprising a reaction product of the pBDEA and jER828 was provided. Benzyl alcohol, an unreactive diluent, was added thereto for dilution in an amount of 40 mass % relative to the total amount, and an epoxy resin curing agent in which the concentration of the reaction composition was 60 mass % was provided.

The active hydrogen equivalent weight (AHEW) of the epoxy resin curing agent (the total amount including benzyl alcohol) was 110.3.

Preparation and Evaluation of Epoxy Resin Composition

As the epoxy resin as the main agent of the epoxy resin composition, a polyfunctional epoxy resin having glycidyloxy groups derived from bisphenol A ("jER828" manufactured by Mitsubishi Chemical Corporation, epoxy equivalent: 186 g/equivalent) was used. The epoxy resin and the epoxy resin curing agent were formulated and mixed such that the ratio of the number of active hydrogen atoms in the curing agent to the number of epoxy groups in the epoxy resin (number of active hydrogen atoms in the curing agent/number of epoxy groups in the epoxy resin) reached 1/1 to prepare an epoxy resin composition.

The resulting epoxy resin composition was used to conduct various evaluations. The results are shown in Table 1.

Example 2

An epoxy resin curing agent was provided in the same manner as in Example 1 except that, in "Preparation of epoxy resin curing agent" of Example 1, 43.3 g of pBDEA-2M provided in Production Example 2 and 16.7 g of jER828 were used instead of 41.3 g of pBDEA and 18.7 g of jER828. The epoxy resin curing agent was used to prepare an epoxy resin composition in the same manner as in Example 1 and the evaluation abovementioned was conducted. The results are shown in Table 1.

Example 3

An epoxy resin curing agent was provided in the same manner as in Example 1 except that, in Example 1, 41.3 g of mBDEA provided in Production Example 3 was used instead of 41.3 g of pBDEA. The epoxy resin curing agent was used to prepare an epoxy resin composition in the same manner as in Example 1 and the evaluation abovementioned was conducted. The results are shown in Table 1.

Comparative Example 1

An epoxy resin curing agent was provided in the same manner as in Example 1 except that, in Example 1, 38.8 g of metaxylylenediamine (MXDA, manufactured by Mitsubishi Gas Chemical Company, Inc.) was used instead of 41.3 g of pBDEA. The epoxy resin curing agent was used to prepare an epoxy resin composition in the same manner as in Example 1 and the evaluation abovementioned was conducted. The results are shown in Table 1.

TABLE 1

| | | | Example | | | Comparative Example |
|---|---|---|---|---|---|---|
| | | | 1 | 2 | 3 | 1 |
| Epoxy resin composition | Epoxy resin curing agent (adduct modified product) | Polyamine (A) | pBDEA | pBDEA-2M | mBDEA | MXDA |
| | | Epoxy compound | jER828 | jER828 | jER828 | jER828 |
| | | Number of active hydrogen atoms in polyamine (A)/number of epoxy groups in epoxy compound | 10/1 | 10/1 | 10/1 | 10/1 |
| | | AHEW | 110.3 | 123.1 | 110.3 | 97.4 |
| | Main agent epoxy resin | | jER828 | jER828 | jER828 | jER828 |
| | Number of active hydrogen atoms in curing agent/number of epoxy groups in main agent epoxy resin | | 1/1 | 1/1 | 1/1 | 1/1 |
| Evaluation results | RCI curing time (time: minutes) | Set to Touch | 1:30 | 1:30 | 1:30 | 1:30 |
| | | Dust Free | 2:45 | 2:30 | 3:00 | 2:30 |
| | | Dry through | 6:00 | 4:00 | 3:45 | 3:15 |
| | Coating film appearance | Transparency | G | Ex | Ex | F |
| | Set to Touch(1d/2d/7d) | | Ex/Ex/Ex | Ex/Ex/Ex | Ex/Ex/Ex | Ex/Ex/Ex |
| | Pencil hardness (1d/2d/7d) | | H/H/H | H/H/F | F/H/H | H/H/H |
| | Water resistance spot (1d/2d/7d) | | F/F/F | Ex/G/G | G/G/G | F/F/F |
| | YI | Before weather resistance test | 3.3 | 1.2 | 2.0 | 2.6 |
| | | After weather resistance test | 15.9 | 13.6 | 16.4 | 36.6 |
| | | ΔYI | 12.6 | 12.4 | 14.4 | 34.0 |

Example 4

An epoxy resin curing agent was provided in the same manner as in Example 1 except that, in Example 1, 2.0 g of pBDEA, 37.0 g of MXDA, and 21.1 g of jER828 were used instead of 41.3 g of pBDEA and 18.7 g of jER828. The epoxy resin curing agent was used to prepare an epoxy resin composition in the same manner as in Example 1 and the evaluation abovementioned was conducted. The results are shown in Table 2.

Example 5

An epoxy resin curing agent was provided in the same manner as in Example 4 except that, in Example 4, the amount of pBDEA was changed to 3.9 g, the amount of MXDA was changed to 35.2 g, and the amount of jER828 was changed to 21.0 g. The epoxy resin curing agent was used to prepare an epoxy resin composition in the same manner as in Example 4 and the evaluation abovementioned was conducted. The results are shown in Table 2.

Example 6

An epoxy resin curing agent was provided in the same manner as in Example 4 except that, in Example 4, the amount of pBDEA was changed to 5.9 g, the amount of MXDA was changed to 33.3 g, and the amount of jER828 was changed to 20.8 g. The epoxy resin curing agent was used to prepare an epoxy resin composition in the same manner as in Example 4 and the evaluation abovementioned was conducted. The results are shown in Table 2.

Example 7

An epoxy resin curing agent was provided in the same manner as in Example 4 except that, in Example 4, the amount of pBDEA was changed to 7.86 g, the amount of MXDA was changed to 31.44 g, and the amount of jER828 was changed to 20.7 g. The epoxy resin curing agent was used to prepare an epoxy resin composition in the same manner as in Example 4 and the evaluation abovementioned was conducted. The results are shown in Table 2.

Example 8

An epoxy resin curing agent was provided in the same manner as in Example 4 except that, in Example 4, the amount of pBDEA was changed to 20.05 g, the amount of MXDA was changed to 20.05 g, and the amount of jER828 was changed to 19.9 g. The epoxy resin curing agent was used to prepare an epoxy resin composition in the same manner as in Example 4 and the evaluation abovementioned was conducted. The results are shown in Table 2.

TABLE 2

| | | | Comparative Example | Example | | | | | |
|---|---|---|---|---|---|---|---|---|---|
| | | | 1 | 4 | 5 | 6 | 7 | 8 | 1 |
| Epoxy resin composition | Epoxy resin curing agent (adduct modified product) | Polyamine (A) MXDA/pBDEA (mass ratio) | 100/0 | 95/5 | 90/10 | 85/15 | 80/20 | 50/50 | 0/100 |
| | | Epoxy compound | jER828 | jER828 | jER828 | jER828 | jER828 | jER828 | jER828 |
| | | Number of active hydrogen atoms in polyamine (A)/number | 10/1 | 10/1 | 10/1 | 10/1 | 10/1 | 10/1 | 10/1 |

TABLE 2-continued

| | | | Comparative Example | Example | | | | |
|---|---|---|---|---|---|---|---|---|
| | | | 1 | 4 | 5 | 6 | 7 | 8 | 1 |
| | | of epoxy groups in epoxy compound | | | | | | | |
| | | AHEW | 97.4 | 98.0 | 98.4 | 98.9 | 99.5 | 102.9 | 110.3 |
| | Main agent epoxy resin | | jER828 | jER828 | jER828 | jER828 | jER828 | jER828 | jER828 |
| | Number of active hydrogen atoms in curing agent/number of epoxy groups in main agent epoxy resin | | 1/1 | 1/1 | 1/1 | 1/1 | 1/1 | 1/1 | 1/1 |
| Evaluation results | RCI curing time (time: minutes) | Set to Touch | 1:30 | 1:30 | 1:30 | 1:45 | 1:45 | 1:30 | 1:30 |
| | | Dust Free | 2:30 | 2:30 | 2:45 | 2:45 | 2:45 | 2:45 | 2:45 |
| | | Dry through | 3:15 | 3:45 | 3:15 | 3:15 | 3:15 | 4:15 | 6:00 |
| | Coating film appearance | Transparency | F | Ex | Ex | Ex | Ex | Ex | G |
| | Water resistance spot (1d/2d/7d) | | F/F/F | F/F/F | F/F/F | F/F/F | F/F/F | G/G/G | F/F/F |
| | YI | Before weather resistance test | 2.6 | 1.7 | 1.9 | 2.5 | 5.7 | 4.9 | 3.3 |
| | | After weather resistance test | 36.6 | 23.0 | 21.8 | 22.6 | 23.5 | 18.7 | 15.9 |
| | | ΔYI | 34.0 | 21.3 | 19.9 | 20.1 | 17.8 | 13.8 | 12.6 |

Example 9

An epoxy resin curing agent was provided in the same manner as in Example 2 except that, in Example 2, 7.94 g of pBDEA-2M, 31.76 g of MXDA, and 20.3 g of jER828 were used instead of 43.3 g of pBDEA-2M and 16.7 g of jER828. The epoxy resin curing agent was used to prepare an epoxy resin composition in the same manner as in Example 2 and the evaluation abovementioned was conducted. The results are shown in Table 3.

Example 10

An epoxy resin curing agent was provided in the same manner as in Example 9 except that, in Example 9, the amount of pBDEA-2M was changed to 20.5 g, the amount of MXDA was changed to 20.5 g, and the amount of jER828 was changed to 19.0 g. The epoxy resin curing agent was used to prepare an epoxy resin composition in the same manner as in Example 9 and the evaluation abovementioned was conducted. The results are shown in Table 3.

TABLE 3

| | | | Comparative Example | Example | | |
|---|---|---|---|---|---|---|
| | | | 1 | 9 | 10 | 2 |
| Epoxy resin composition | Epoxy resin curing agent (adduct modified product) | Polyamine (A) MXDA/pBDEA-2M (mass ratio) | 100/0 | 80/20 | 50/50 | 0/100 |
| | | Epoxy compound | jER828 | jER828 | jER828 | jER828 |
| | | Number of active hydrogen atoms in polyamine (A)/number of epoxy groups in epoxy compound | 10/1 | 10/1 | 10/1 | 10/1 |
| | | AHEW | 97.4 | 101.0 | 107.8 | 123.1 |
| | Main agent epoxy resin | | jER828 | jER828 | jER828 | jER828 |
| | Number of active hydrogen atoms in curing agent/number of epoxy groups in main agent epoxy resin | | 1/1 | 1/1 | 1/1 | 1/1 |
| Evaluation results | RCI curing time (time: minutes) | Set to Touch | 1:30 | 1:30 | 1:45 | 1:30 |
| | | Dust Free | 2:30 | 2:30 | 2:45 | 2:30 |
| | | Dry through | 3:15 | 3:15 | 3:15 | 4:00 |
| | Coating film appearance | Transparency | F | Ex | Ex | Ex |
| | Water resistance spot (1d/2d/7d) | | F/F/F | F/F/F | F/F/F | Ex/G/G |
| | YI | Before weather resistance test | 2.6 | 4.0 | 4.1 | 1.2 |
| | | After weather resistance test | 36.6 | 27.7 | 22.9 | 13.6 |
| | | ΔYI | 34.0 | 23.7 | 18.8 | 12.4 |

Example 11

An epoxy resin curing agent was provided in the same manner as in Example 3 except that, in Example 3, 7.86 g of mBDEA, 31.44 g of MXDA, and 20.7 g of jER828 were used instead of 41.3 g of mBDEA and 18.7 g of jER828. The epoxy resin curing agent was used to prepare an epoxy resin composition in the same manner as in Example 3 and the evaluation abovementioned was conducted. The results are shown in Table 4.

Example 12

An epoxy resin curing agent was provided in the same manner as in Example 11 except that, in Example 11, the amount of mBDEA was changed to 20.05 g, the amount of MXDA was changed to 20.05 g, and the amount of jER828 was changed to 19.9 g. The epoxy resin curing agent was used to prepare an epoxy resin composition in the same manner as in Example 11 and the evaluation abovementioned was conducted. The results are shown in Table 4.

TABLE 4

| | | | Comparative Example | Example | | |
|---|---|---|---|---|---|---|
| | | | 1 | 11 | 12 | 3 |
| Epoxy resin composition | Epoxy resin curing agent (adduct modified product) | Polyamine (A) MXDA/mBDEA (mass ratio) | 100/0 | 80/20 | 50/50 | 0/100 |
| | | Epoxy compound | jER828 | jER828 | jER828 | jER828 |
| | | Number of active hydrogen atoms in polyamine (A)/number of epoxy groups in epoxy compound | 10/1 | 10/1 | 10/1 | 10/1 |
| | | AHEW | 97.4 | 99.5 | 102.9 | 110.3 |
| | Main agent epoxy resin | | jER828 | jER828 | jER828 | jER828 |
| | Number of active hydrogen atoms in curing agent/number of epoxy groups in main agent epoxy resin | | 1/1 | 1/1 | 1/1 | 1/1 |
| Evaluation results | RCI curing time (time: minutes) | Set to Touch | 1:30 | 1:30 | 1:15 | 1:30 |
| | | Dust Free | 2:30 | 2:45 | 2:45 | 3:00 |
| | | Dry through | 3:15 | 4:00 | 4:00 | 3:45 |
| | Coating film appearance | Transparency | F | Ex | Ex | Ex |
| | Water resistance spot (1d/2d/7d) | | F/F/F | G/G/G | G/G/G | G/G/G |
| | YI | Before weather resistance test | 2.6 | 2.9 | 2.0 | 2.0 |
| | | After weather resistance test | 36.6 | 25.8 | 22.9 | 16.4 |
| | | ΔYI | 34.0 | 22.9 | 20.9 | 14.4 |

It can be seen from Tables 1 to 4 that coating films provided from the epoxy resin compositions containing the epoxy resin curing agent of the present invention had better transparency and weather resistance than that of Comparative Example 1. Additionally, the epoxy resin compositions provided had also good curing property.

Further as shown in Tables 2 to 4, it also can be seen that the epoxy resin compositions in which the epoxy resin curing agent of Examples 2, 3, 8, 11, or 12 was used provided coating films having improved water resistance in comparison with that of Comparative Example 1.

INDUSTRIAL APPLICABILITY

The present invention can provide an epoxy resin curing agent and an epoxy resin composition with which coating films excellent in transparency and weather resistance can be formed, and paints containing these.

The invention claimed is:

1. An epoxy resin curing agent comprising an adduct modified product of a polyamine (A), wherein the polyamine (A) comprises a diamine (A1) represented by the following formula (1):

(1)

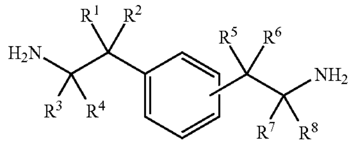

wherein $R^1$ to $R^8$ each independently represents a hydrogen atom or an aliphatic group having 1 to 5 carbon atoms, wherein the adduct modified product is a reaction composition comprising a reaction product of the polyamine (A) and an epoxy compound having at least one epoxy group, and the diamine (A1) is at least one selected from the group consisting of diamines represented by the following formulas (1-1) to (1-3):

(1-1)

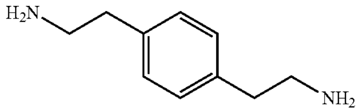

(1-2)

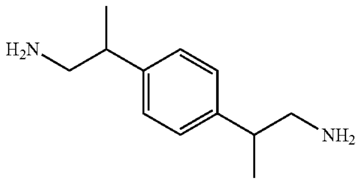

-continued (1-3)

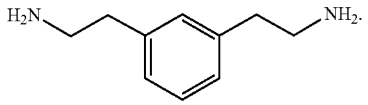

2. The epoxy resin curing agent according to claim 1, wherein the content of the diamine (A1) in the polyamine (A) is 5 mass % or more.

3. The epoxy resin curing agent according to claim 1, wherein the polyamine (A) further comprises xylylenediamine.

4. The epoxy resin curing agent according to claim 3, wherein a mass ratio between the diamine (A1) and the xylylenediamine in the polyamine (A) is 5/95 to 99/1.

5. The epoxy resin curing agent according to claim 1, wherein the total content of the polyamine (A) and an adduct modified product thereof in the entire curing agent components included in the epoxy resin curing agent is 50 mass % or more.

6. An epoxy resin composition comprising an epoxy resin and the epoxy resin curing agent according to claim 1.

7. A paint comprising the epoxy resin composition according to claim 6.

* * * * *